(12) United States Patent
Genot et al.

(10) Patent No.: US 8,025,580 B2
(45) Date of Patent: Sep. 27, 2011

(54) SHAFT FOR TRANSMITTING ROTATIONAL MOVEMENTS AND/OR FORCES

(75) Inventors: Michel Genot, Relans (FR); Jean-Michel Buchin, Lons le Saunier (FR)

(73) Assignee: SKF Aerospace France, Saint-Vallier-sur-Rhone (FR)

( * ) Notice: Subject to any disclaimer, the term of this patent is extended or adjusted under 35 U.S.C. 154(b) by 207 days.

(21) Appl. No.: 12/213,208

(22) Filed: Jun. 16, 2008

(65) Prior Publication Data

US 2009/0005184 A1 Jan. 1, 2009

(30) Foreign Application Priority Data

Jun. 18, 2007 (FR) ..................................... 07 04322

(51) Int. Cl.
*F16C 3/00* (2006.01)
(52) U.S. Cl. ......................... 464/181; 464/182; 464/183
(58) Field of Classification Search .................. 464/181, 464/182, 183, 162, 179
See application file for complete search history.

(56) References Cited

U.S. PATENT DOCUMENTS

| | | | |
|---|---|---|---|
| 2,197,883 A | | 4/1940 | Morton |
| 3,400,558 A | * | 9/1968 | Haines ........................... 464/162 |
| 4,033,020 A | * | 7/1977 | Hudgens ..................... 29/898.03 |
| 4,272,971 A | * | 6/1981 | Loyd et al. ..................... 464/181 |
| 4,530,379 A | * | 7/1985 | Policelli ......................... 138/109 |
| 4,622,022 A | * | 11/1986 | Diffenderfer et al. ......... 464/162 |
| 4,664,644 A | * | 5/1987 | Kumata et al. ................ 464/180 |
| 4,667,530 A | * | 5/1987 | Mettler et al. .................. 74/493 |
| 4,834,693 A | * | 5/1989 | Profant et al. ................ 464/183 |
| 4,838,833 A | | 6/1989 | Coursin |
| 5,135,204 A | * | 8/1992 | Funahashi ................... 267/141.4 |
| 5,141,248 A | * | 8/1992 | Haldric et al. ................. 280/777 |
| 5,342,464 A | * | 8/1994 | McIntire et al. ............... 156/172 |
| 5,507,203 A | * | 4/1996 | Audibert et al. ................ 74/492 |
| 5,827,122 A | * | 10/1998 | Kurian ........................... 464/162 |
| 6,149,526 A | * | 11/2000 | Boersma et al. ................ 464/89 |
| 6,210,283 B1 | * | 4/2001 | Wojciechowski et al. ..... 464/181 |
| 6,561,912 B1 | * | 5/2003 | Link ............................... 464/181 |
| 6,705,946 B2 | * | 3/2004 | Bridges ............................. 464/8 |
| 6,904,680 B2 | * | 6/2005 | Fidziukiewicz .......... 29/898.059 |
| 7,083,523 B2 | * | 8/2006 | Haile et al. ...................... 464/180 |
| 7,112,141 B2 | * | 9/2006 | Sakurai et al. ................. 464/183 |
| 7,152,708 B2 | * | 12/2006 | Campbell ....................... 180/376 |
| 7,172,361 B2 | * | 2/2007 | Minamoto et al. .......... 403/359.5 |
| 7,650,818 B2 | * | 1/2010 | Inoue et al. .................... 74/594.1 |
| 2001/0014624 A1 | * | 8/2001 | Edi .................................. 464/179 |
| 2002/0117228 A1 | * | 8/2002 | Nakajima et al. ............. 138/153 |
| 2002/0173363 A1 | * | 11/2002 | Makino et al. ................ 464/182 |
| 2007/0213136 A1 | * | 9/2007 | Borges et al. .................. 464/179 |
| 2008/0119296 A1 | * | 5/2008 | Kennedy ........................ 464/181 |
| 2009/0181779 A1 | * | 7/2009 | Wagner et al. ................ 464/162 |
| 2010/0012908 A1 | * | 1/2010 | Sjostedt ......................... 254/266 |
| 2010/0029397 A1 | * | 2/2010 | Schneider et al. ............. 464/162 |
| 2010/0074702 A1 | * | 3/2010 | Kluge ............................ 408/125 |
| 2010/0075766 A1 | * | 3/2010 | Neugebauer et al. ......... 464/162 |
| 2010/0113169 A1 | * | 5/2010 | Ryu ............................... 464/181 |

* cited by examiner

FOREIGN PATENT DOCUMENTS

DE 43 19 817 A1 12/1993

*Primary Examiner* — Aaron Dunwoody
(74) *Attorney, Agent, or Firm* — Dowell & Dowell, P.C.

(57) ABSTRACT

A rotary torque shaft including a tube made of a composite material having a plastic matrix and a metallic tubular insert fixedly mounted around a recessed longitudinal outer surface portion of the tube so as to link the tube mechanically to a functional mechanical assembly which is supported by the insert. The insert has in cross section a non-circular inner surface profile which is complementary in shape to a profile of the outer surface of the tube.

11 Claims, 3 Drawing Sheets

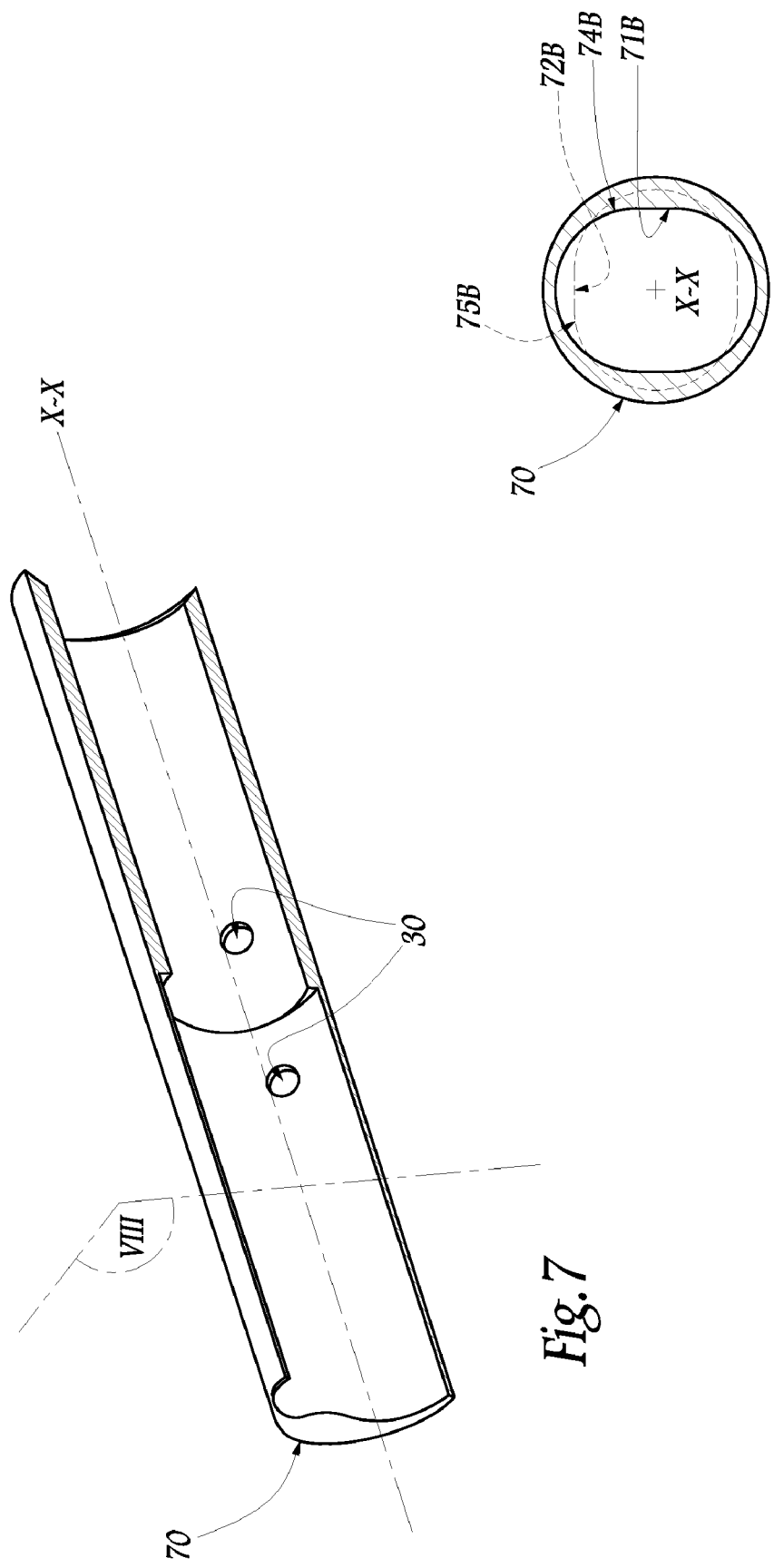

SHAFT FOR TRANSMITTING ROTATIONAL MOVEMENTS AND/OR FORCES

BACKGROUND OF THE INVENTION

1. Field of the Invention

The present invention relates to a shaft for transmitting rotational movements and/or forces, also commonly called a "torque shaft".

2. Brief Description of the Related Art

The invention relates in particular to what are known as "composite" shafts, i.e. shafts of which the main body consists of a tube made of a composite material having a plastic matrix, in other words made of a material composed of a thermoplastic or thermosetting resin and of an, in particular fibrous, mechanical strength reinforcement.

This type of shaft is used, in particular in the field of aeronautics, to carry various functional mechanical assemblies, particularly mechanisms, which are actuated or stressed as the shaft is being rotated about itself. Thus, this type of shaft is used to deploy flaps on the leading edge and trailing edge of airplane wings in order thereby to improve lift, or to orient the airplane door latches so that these doors can be opened and closed. In the automotive field, this type of shaft can be used as a steering column.

In practice, to prevent deterioration of the tube of composite material, the abovementioned mechanisms are not directly supported by the tube but rather by metallic tubular inserts which are arranged fixedly around the tube and which ensure a good mechanical link between the tube and the mechanisms. However, as the tube twists and therefore as forces are transmitted by the insert between the tube and the mechanisms, the interface region, of circular section, between each insert and the tube is subjected to high shear stresses which, in particular eventually, can destroy the plastic resin surrounded by the insert. In other words, the performance of currently available shafts, in terms of torsional strength, is limited.

SUMMARY OF THE INVENTION

The object of the present invention is to provide a transmission shaft having a tube made of composite material, the mechanical performance of which in torsion is significantly improved.

To this end, the subject of the invention is a shaft for transmitting rotational movements and/or forces, comprising firstly a tube made of a composite material having a plastic matrix and secondly a metallic tubular insert arranged fixedly around a longitudinal portion of the tube and designed to link the tube mechanically to a functional mechanical assembly which is supported by the insert and is for instance a pin, a rolling bearing, a latch or the like, wherein the insert has in cross section at least one noncircular inner profile, to which the outer surface of the longitudinal portion of the tube is adapted in a substantially complementary manner.

The idea on which the invention is based is to prevent the contact interface between the inner surface of the insert and the outer surface of the composite tube from having a strictly circular section in favor of a noncircular section. In fact, by virtue of this arrangement, the transmission of forces between the tube and the insert as the shaft is being subjected to torsional stress does not induce exclusively shear stresses at this interface, because the stresses are decoupled into shear stresses on the one hand and compressive stresses on the other. In this way, compared with an insert having a strictly circular interior section, the shear stresses experienced at the interface between the insert and the tube are significantly less for a given torsional stress of the shaft. At the noncircular portions of the or each inner profile of the insert, the force transmitted between the tube and the insert is thus not strictly orthoradial to the central longitudinal axis of the shaft, but rather has a nonzero radial component in the cross section of the shaft. In this manner, at the abovementioned noncircular portions, the tube and the insert are pressed radially against one another, thus mechanically linking these two components together in the manner of a wedge. Thus the invention is based on the mechanical cooperation between the inner surface of the insert, which has (a) noncircular profile(s) in cross section, and the complementary outer surface of the portion of the tube surrounded by this insert, it being understood that the invention is not limited by the exact geometric shape of the inner profile of the insert, or by the materials of which the metallic insert and the composite tube are made, or by the method of manufacturing the shaft.

According to particular advantageous features of the shaft according to the invention, taken individually or in any possible technical combination:

- the or each inner profile of the insert includes at least one rectilinear segment;
- the or each inner profile of the insert includes at least two substantially parallel rectilinear segments opposite one another on the periphery of the insert;
- the or each inner profile of the insert has an oblong shape;
- the or each inner profile of the insert has a quadrilateral shape, such as a square, rectangular or rhombus shape;
- the or each inner profile of the insert has a multilobe shape, such as a peanut shape;
- the insert has, in successive cross sections along its length, at least two in each case noncircular inner profiles which, when projected onto the same cross-sectional plane, do not coincide with one another;
- the two profiles are similar and offset by 90° with respect to one another about the central longitudinal geometric axis of the insert;
- the outer surface of the insert is cylindrical with a circular base; and
- the tube comprises, lengthwise on each side of its longitudinal portion surrounded by the insert, portions having an outer surface which is cylindrical with a circular base and extends flush with the outer surface of the insert.

BRIEF DESCRIPTION OF THE DRAWINGS

The invention will be better understood from the following description, given merely by way of example and referring to the drawings, in which:

FIG. 7 is a perspective view of a longitudinal section through an insert of a different embodiment according to the invention; and FIG. 8 is a cross section on the plane VIII in FIG. 7.

DESCRIPTION OF THE PREFERRED EMBODIMENTS

Figure 1:
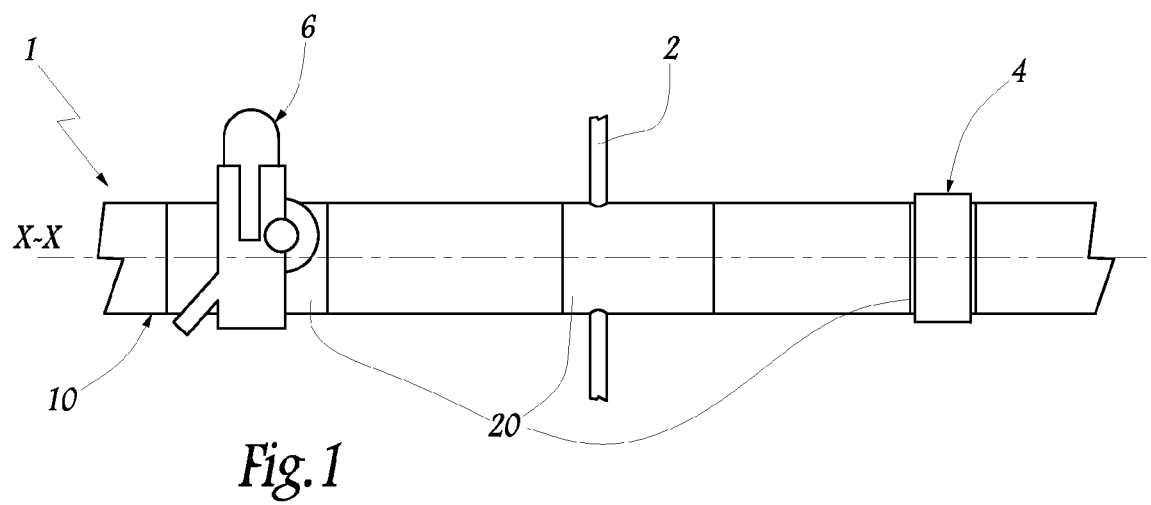
FIG. 1 is a schematic elevation view of a shaft according to the invention.

FIG. 1 shows a shaft 1 having overall a central longitudinal geometric axis X-X. This shaft is intended to be stressed when rotated about itself, about its axis X-X, in order to transmit rotary movements and/or forces centered on the axis X-X, between for example a structural part (not shown), which is arranged in particular at one of the longitudinal ends of the shaft, and various functional mechanical assemblies carried by the shaft. In the example illustrated in FIG. 1, three assemblies of this type are shown, namely a physical pin 2 in the form of a solid rod passing diametrically from one side of the shaft 1 to the other, and two mechanisms 4 and 6 corresponding respectively to a rolling bearing and an opening/closing latch of a door (the latter not being shown). Other assemblies, in particular different mechanisms from those illustrated in FIG. 1, can be held on the shaft 1, in particular assemblies including several metallic parts which have more or less complex structures and have in common the feature of being actuated and/or stressed when the shaft 1 is rotating about itself.

The shaft 1 comprises a main body in the form of an overall cylindrical hollow tube 10 centered on the axis X-X. This tube is made of a composite material consisting of a plastic matrix, in particular of a thermoplastic or thermosetting resin, reinforced for reasons of mechanical strength, typically by fibers.

The assemblies 2, 4 and 6 are supported by the tube 10, with respective metal inserts 20 inserted therebetween. Each of these inserts is arranged fixedly around a longitudinal portion 12 of the tube 10, in order to link this portion mechanically to the corresponding assembly.

Figure 2:
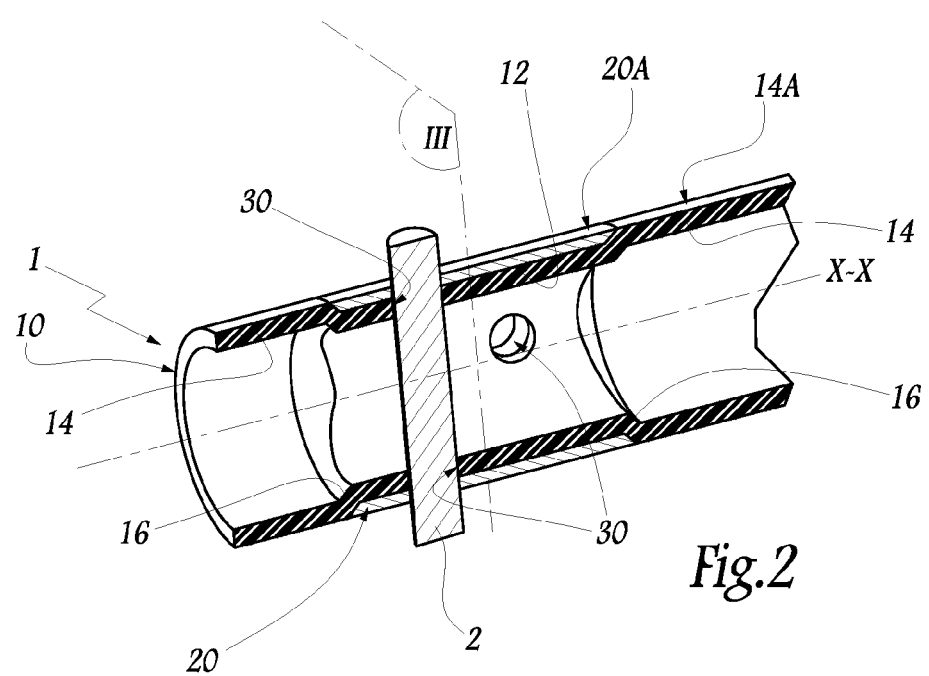
FIG. 2 is a perspective view of a longitudinal section through a portion of the shaft of FIG. 1.

FIG. 2 shows in greater detail the insert 20 and the portion 12 of the tube 10 which is associated with the pin 2. As can easily be seen in this figure, this insert and this tube portion have several holes 30 passing radially through them from one side to the other, in particular two diametrically opposed holes with respect to the axis X-X and intended to receive in a complementary manner the rod constituting the pin 2, in order for this pin, this insert and this tube portion to be rotationally linked. In practice, the presence and arrangement of through-holes, such as the holes 30 illustrated in FIG. 2, are variable in the sense that the presence and position of these holes depend directly on the nature of the mechanical assembly supported by the insert in question. For example, the insert supporting the rolling bearing 4 and the corresponding tube portion may have no through-holes when the inner ring of this rolling bearing is force fitted around the insert in order to be linked mechanically thereto.

Figure 3:
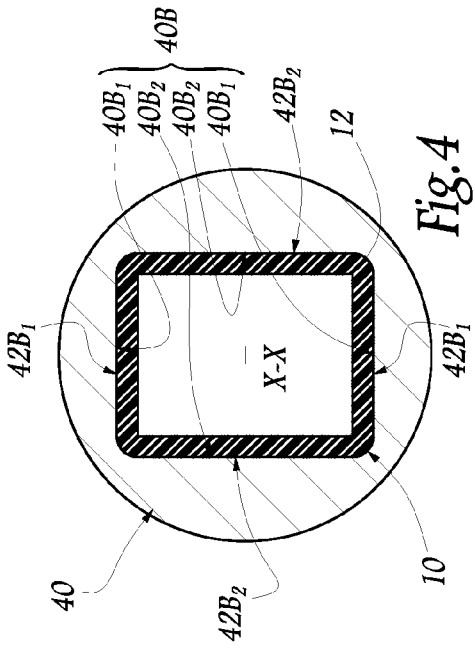
FIG. 3 is a cross section through the shaft on the plane III shown in FIG. 2.

Advantageously, as can easily be seen in the case of the insert 20 illustrated in FIGS. 2 and 3, each insert defines a cylindrical outer surface 20A with a circular base and centered on the axis X-X. This surface 20A extends flush with the outer surface 14A, which is likewise cylindrical with a circular base and centered on the axis X-X, of the portions 14 of the tube 10 located on either side of the tube portion 12, along the length of this tube. In this way, the presence of each insert does not induce any surface discontinuity on the exterior of the shaft 10. To do this, the tube portion 12 is provided with a longitudinally recessed portion or set back, toward the interior, from the portions 14, while being connected to these portions at each of its longitudinal ends by shoulders 16. The set back longitudinal portion will have different outer surface shapes which, in accordance with the invention, will be complementary to the inner surface configuration, profile or shape of an inner surface of the insert 20, as will be described with respect to FIGS. 3-8.

As can easily be seen in FIG. 3, each insert 20 does not have a strictly circular inner section, but rather has, in cross section through the axis X-X, an oblong inner profile 20B centered on the axis X-X. In more precise geometrical terms, the profile 20B consists of two diametrically opposed curved parts $20B_1$, the respective middle portions of which correspond to circular arcs centered on the axis X-X, and of two diametrically opposed parallel rectilinear segments $20B_2$ offset by 90° about the axis X-X with respect to the parts $20B_1$. Since the outer surface 20A has a circular base, the thickness of the cross section of the insert can vary around its periphery, this thickness being smaller radially between each part $20B_1$ and the surface 20A than radially between each segment $20B_2$ and the surface 20A.

The tube portion 12 is shaped in a complementary manner to the inner surface of the insert 20, such that its outer surface 12A has, in cross section, an oblong profile corresponding to the profile 20B. In more precise geometrical terms, the profile 12A consists of two diametrically opposed curved parts $12A_1$ the respective middle portions of which correspond to circular arcs centered on the axis X-X, and of two diametrically opposed parallel rectilinear segments $12A_2$ offset by 90° about the axis X-X with respect to the parts $12A_1$. In practice, the shapes of the inner surface of the insert and the outer surface of the tube portion 12 are easily adapted to one another because of the composite nature of the tube 10, it being possible to manufacture the latter with various geometrical configurations. In particular, the tube portion 12 is advantageously manufactured directly inside the corresponding insert 20, starting from a fibrous preform arranged inside the insert and into which a plastic such as an epoxy resin is injected in order to form a matrix. It is likewise understood that the thickness of the tube portion 12 can also either be substantially constant around its periphery, as in the example shown in the figures, or may vary around this periphery.

In use, the shaft 1 is subjected to torsional stress, i.e. is stressed when rotated on itself about the axis X-X, in particular from one of its ends. This results in forces being transmitted between the tube 10 and each mechanical assembly 2, 4, 6 partially, or exclusively, via the inserts 20. The oblong inner profile 20B of each insert allows the stresses at the interface between the insert and the corresponding tube portion 12 to be decoupled: at the curved parts $20B_1$, these stresses tend to shear this interface by torsion about the axis X-X, while at the rectilinear segments $20B_2$, these stresses tend to compress or pull on this interface by pressing the insert and the tube against one another. The rotational driving forces are thus effectively transmitted between the tube and each mechanical assembly 2, 4, 6 while limiting the risk of decohesion between each insert 20 and the corresponding tube portions 12 at their contact interface, especially by destroying the resin forming the matrix of these tube portions 12.

Figure 4:
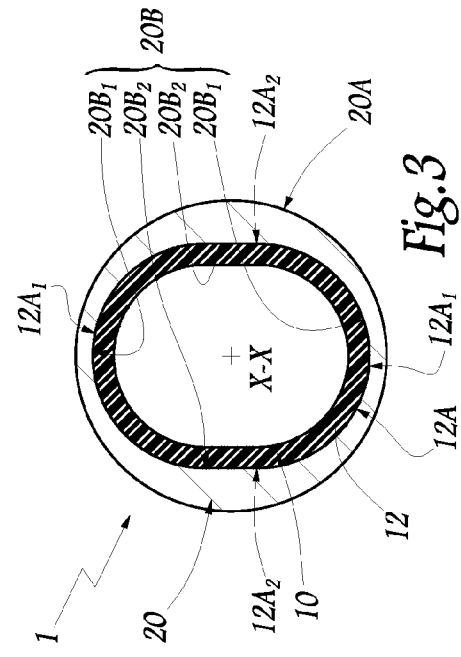
FIGS. 4 to 6 are views similar to FIG. 3, illustrating embodiments of shafts according to the invention.
Figure 5:
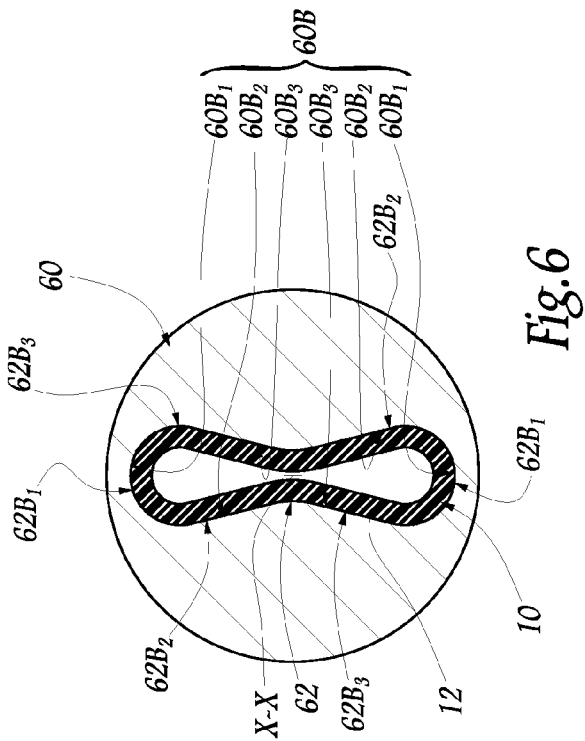
Figure 6:
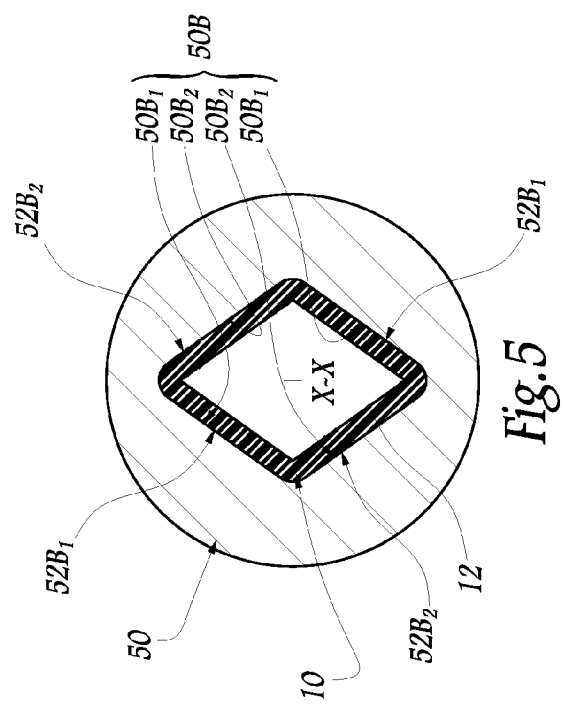

FIGS. 4 to 6 show variants of the insert 20 with the respective references 40, 50 and 60. These variants only differ from the insert 20 in the noncircular geometric shape of their inner profile 40B, 50B and 60B.

Thus, the profiles 40B and 50B of the inserts 40 and 50 each have a quadrilateral shape centered on the axis X-X, namely a rectangular shape for the profile 40B and a rhombus shape for the profile 50B. Each profile 40B, 50B has in this way two pairs of parallel rectilinear segments $40B_1$ and $40B_2$, $50B_1$ and $50B_2$ opposite one another on the periphery of the insert. The two pairs of parallel rectilinear segments of the insert 40 and 50 are cooperatively engaged by same profile outer surfaces of recesses 42 and 52 of the composite tube 12 which have two pairs of oppositely oriented parallel rectilinear segments $42B_1$ and $42B_2$ $52B_1$ and $52B_2$ respectively.

As for the profile 60B of the insert 60, this has a shape consisting of two diametrically opposed lobes with respect to the axis X-X, similar to a peanut shape. The profile 60B in this way includes, at the same time, two diametrically opposed curved parts $60B_1$ belonging to each lobe, two diametrically opposed rectilinear segments 60B₂ each belonging to one of the lobes, and two other diametrically opposed rectilinear segments 60B₃ respectively belonging to each of the lobes, it being noted that for each lobe the segments 60B₂ and 60B₃ converge toward one another in the direction of the axis X-X. In a like manner, the recess 62 of the composite tube has a shape or profile complementary to that of the inner profile of the insert and thus consisting of two diametrically opposed lobes with respect to the axis X-X, similar to a peanut shape. The profile in this way includes, at the same time, two diametrically opposed curved parts 62B₁ belonging to each lobe, two diametrically opposed rectilinear segments 62B₂ each belonging to one of the lobes, and two other diametrically opposed rectilinear segments 62B₃ respectively belonging to each of the lobes, it being noted that for each lobe the segments 62B₂ and 62B₃ converge toward one another in the direction of the axis X-X.

The profiles 40B, 50B and 60B have the same mechanical advantages as the oblong profile 20B in the sense that, at the rectilinear segments 40B₁, 40B₂, 50B₁, 50B₂, 60B₂ and 60B₃ of these profiles, compressive stresses are generated between each insert 40, 50, 60 and the composite tube set back longitudinal portions 42, 52 and 62 adapted to these inserts.

FIG. 7 shows another variant of an insert 70 which, unlike the insert 20, has, in two successive cross-sectional planes along the length of the insert, two different inner profiles 71B and 72B, in the sense that, when projected onto the same cross-sectional plane as shown in FIG. 8 in which the projection of the profile 72B is shown dashed, the two profiles do not coincide with one another. In the example shown in FIG. 7, each of these profiles 71B and 72B has an oblong shape similar to the oblong shape of the inner profile 20B, it being understood that the two oblong shapes of the profiles 71B and 72B are offset with respect to one another about the axis X-X. Advantageously, for reasons linked to increased torsional strength, these two oblong shapes are offset by 90° with respect to one another, this tending to make the mechanical performance of the insert 70 in torsion taken as a whole uniform. In order that the composite tube be cooperatively engaged with the inner profile of the insert 70, the composite tube includes a set back 74 having two different inner profiles 74B and 75B that are complimentary to the profiles 71B and 72B having oblong shapes similar to the oblong shapes of the inner profile 20B, it being understood that the two oblong shapes of the profiles 74B and 75B are offset with respect to one another about the axis X-X by 90° with respect to one another.

By way of variants (not shown) of the insert 70, the two different profiles combined within a single insert, such as the profiles 71B and 72B, may be different from one another, i.e., for example, an inner profile having a quadrilateral shape, such as one of the profiles 40B and 50B, may be combined with a profile having a multilobe shape, such as the profile 60B.

Furthermore, various other arrangements and options for the shaft 1 and its variants described thus far can also be envisioned.

The invention claimed is:

1. A shaft for transmitting rotational movements forces, comprising a tube made of a composite material having a plastic matrix and which includes a set back longitudinal portion located between two spaced longitudinal portions of the tube which respectively extend from opposite ends of the set back longitudinal portion, the set back longitudinal portion having a reduced inner dimension relative to the two longitudinal portions of the tube and having in cross section at least one non-circular outer surface profile, and a metallic tubular insert fixedly seated around the set back longitudinal portion of the tube without covering the two longitudinal portions of the tube, the metallic tubular insert being designed to link the tube mechanically to a functional mechanical assembly which is supported by the insert and having in cross section at least one non-circular inner surface profile which is complementary in configuration to the at least one non-circular outer surface profile of the set back longitudinal portion of the tube.

2. The shaft as claimed in claim 1, wherein the at least one inner surface profile of the insert includes at least one rectilinear segment.

3. The shaft as claimed in claim 2, wherein the at least one inner surface profile of the insert includes at least two substantially parallel rectilinear segments opposite one another on an inner periphery of the insert.

4. The shaft as claimed in claim 1, wherein the at least one inner surface profile of the insert has an oblong shape.

5. The shaft as claimed in claim 1, wherein the at least one non-circular inner surface profile of the insert has a shape selected from a group of shapes consisting of a square, a rectangle, a rhombus, and other quadrilateral shapes.

6. The shaft as claimed in claim 1, wherein the at least one non-circular inner surface profile of the insert has a multilobe shape.

7. The shaft as claimed in claim 1, wherein the insert has, in successive cross sections along a length thereof, at least two non-circular inner surface profiles which, when projected onto the same cross-sectional plane, do not coincide with one another.

8. The shaft as claimed in claim 7, wherein the at least two profiles are similar and offset by 90° with respect to one another about a central longitudinal geometric axis of the insert.

9. The shaft as claimed in claim 1, wherein the outer surface of the insert is cylindrical with a circular base.

10. The shaft as claimed in claim 1, wherein the two spaced longitudinal portions of the tube have an outer surface which is cylindrical so as to be flush with the outer surface of the insert.

11. The shaft of claim 1 wherein the set back longitudinal portion is connected to each of the two spaced longitudinal portions by an outwardly tapered shoulder.

\* \* \* \* \*